May 3, 1927.

W. F. MacGREGOR 1,627,535

COMBINATION HARVESTER THRASHER

Filed March 21. 1925    2 Sheets-Sheet 1

INVENTOR.
WALLACE F. MacGREGOR,

BY James A. Walsh.

ATTORNEY.

May 3, 1927.
W. F. MacGREGOR
1,627,535
COMBINATION HARVESTER THRASHER
Filed March 21, 1925    2 Sheets-Sheet 2
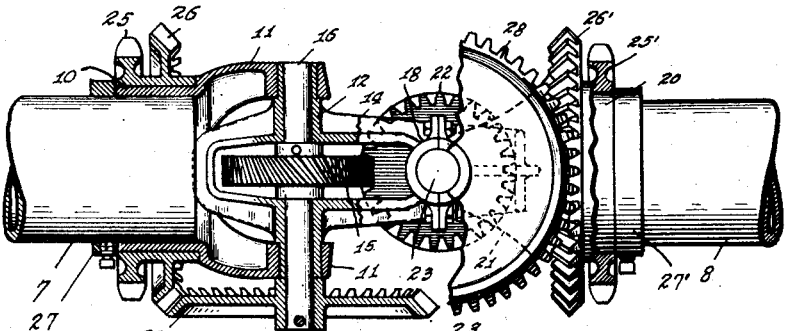
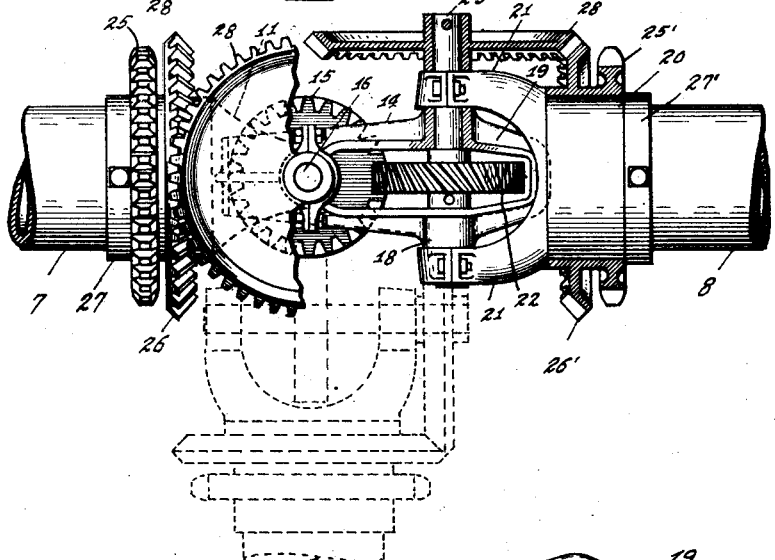
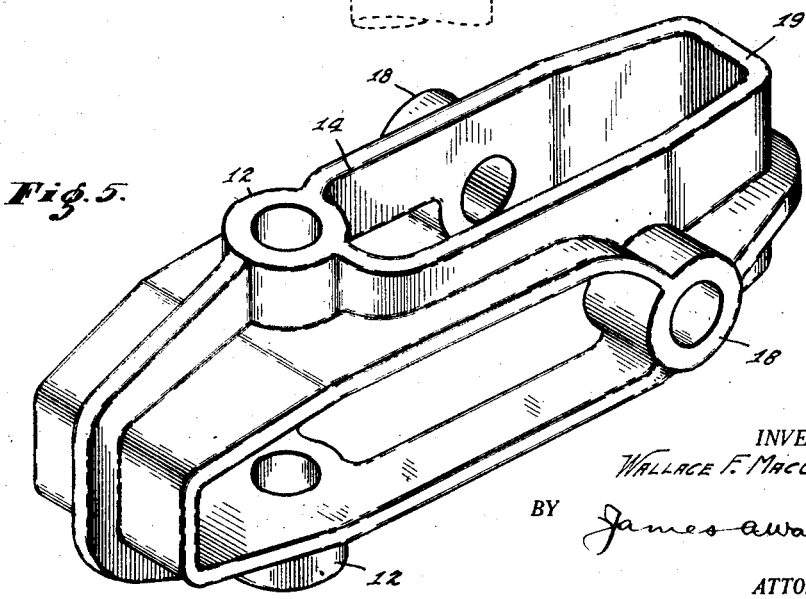
INVENTOR.
WALLACE F. MacGREGOR,
BY James A. Walsh,
ATTORNEY.

Patented May 3, 1927.

1,627,535

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER-THRASHER.

Application filed March 21, 1925. Serial No. 17,384.

My invention relates to improvements in combination harvester-thrashers and particularly to the means for coupling such elements in a manner to permit vertical movements of one in relation to the other and by which the harvester may be swung in a horizontal direction alongside said thrasher to reduce the width of the machine for transportation and storage purposes, and through which coupling also power may be transmitted from said thrasher to the harvester to actuate the latter during the field operations of the machine.

Figure 1:
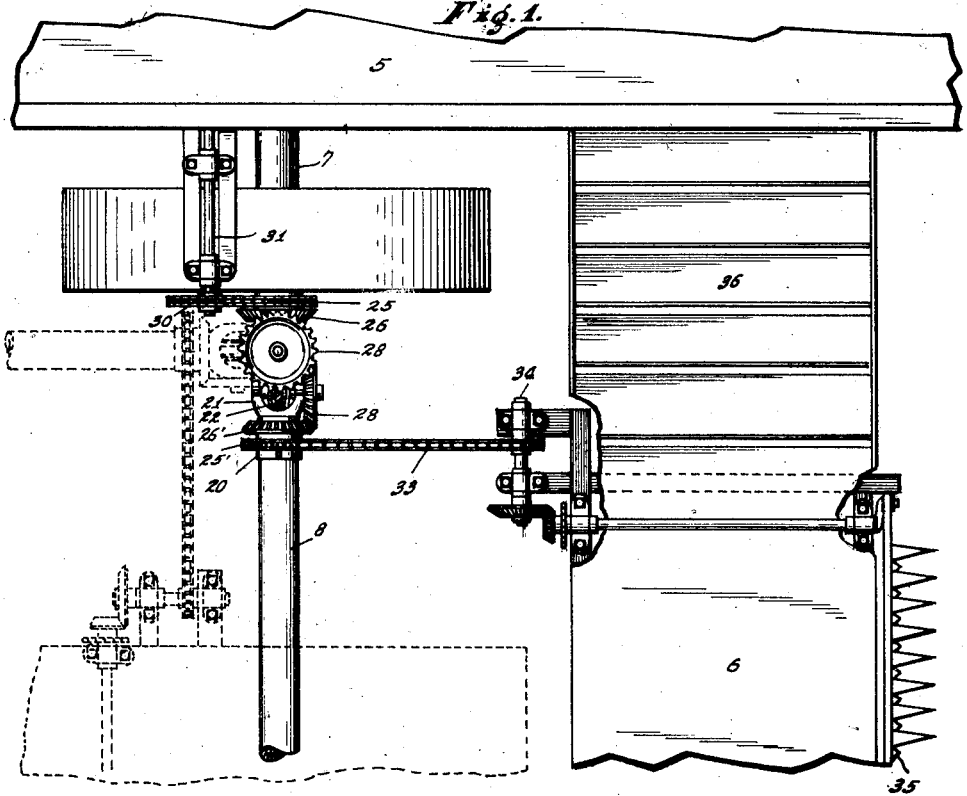
Figure 2:
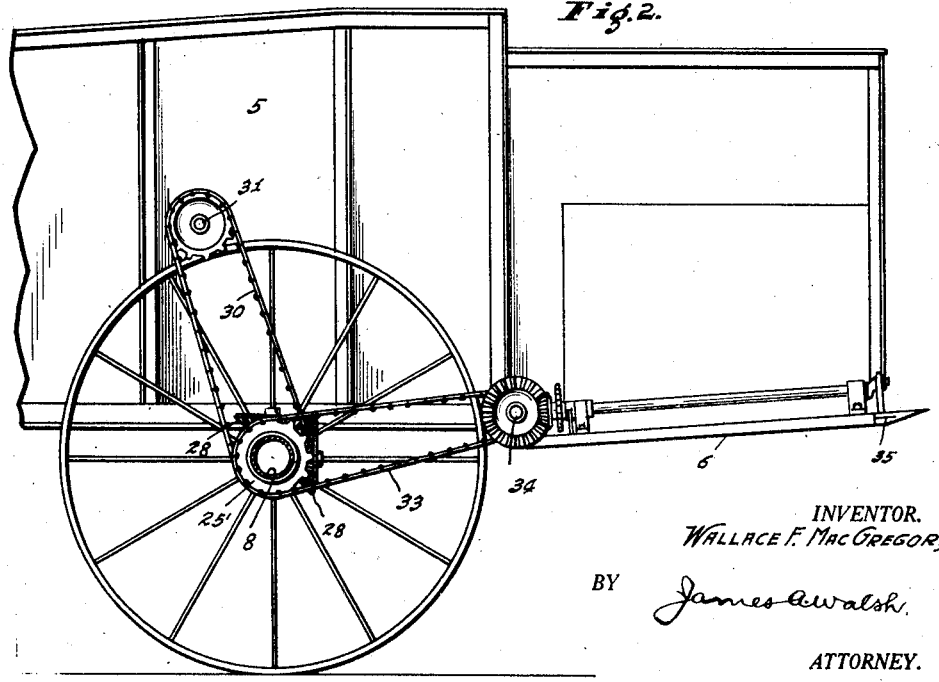

In the accompanying drawings, forming part hereof, Figure 1 is a fragmentary plan of a harvester-thrasher with my improvements applied thereto; Fig. 2 a side elevation indicating the power transmitting mechanism associated with my improved coupling; Fig. 3 an elevation of said coupling; Fig. 4 a plan partially in section indicating the coupling in folded position; and Fig. 5 a perspective of a device which I employ for assembling my improved coupling.

In said drawings the portions marked 5, 6, indicate the thrasher and the harvester, respectively, which it will be understood are provided with appropriate equipment (not shown) for operation but to which it is unnecessary to refer in detail. My improved coupling is shown as applied to the axle sections 7, 8, of the machine, and comprises a flexible joint the elements of which are substantially duplicates and therefore interchangeable. At the end of the axle section 7 I mount a bearing, 10, terminating in knuckles, 11, adapted to aline with the knuckles, 12, of a cage, 14, in which is positioned a spiral gear wheel, 15, said knuckles 11, 12 and wheel 15 being secured together by a pintle, 16, so that said bearing 10 and cage 14 will be in hinged relation to each other. The end of the cage 14 opposite to that described is of similar formation excepting that the knuckles, 18, and the wheel housing, 19, thereof are disposed at right angles to those described, and are connected to a bearing, 20, similar to bearing 10, and mounted on axle section 8, said bearing 20 comprising the knuckles, 21, adapted to be alined with knuckles 18 so that spiral gear, 22, may be assembled therewith by pintle, 23, in a manner similar to the opposite assemblage of like parts. Upon each of the bearings 10 and 20 I mount an actuating mechanism comprising a sprocket, 25, 25', and bevel gear, 26, 26', preferably integrally formed, and secured upon said bearings by removable rings, 27, 27', or otherwise. Upon one end of each of the pintles 16 and 23 I provide a gear, 28, 28', for a purpose to appear. From the foregoing it will be understood that the coupling elements are in duplicate and so connected that the pintles thereof lie in opposite planes, resulting in vertical and horizontal axes, permitting coupling 20 and its associated parts to be adjusted either vertically or horizontally in relation to its mate.

In the application of my improvements the sprocket 25 is connected by a chain, 30, to a rotatable shaft, 31, of the thrasher element of the machine, and when said machine is in operation power is transmitted therefrom to and through sprocket 25, bevel gear 26, and gear wheel 28 to spiral gear 15, which in turn actuates spiral gear 22 to impart motion through pintle 23 to gear 28' and thence to bevel gear 26' and sprocket 25', the latter through chain, 33, transmitting power to a counter-shaft, 34, of the harvester 6, which shaft by suitable connections actuates the reel (not shown), sickle, 35, and conveyer, 36, of said harvester element.

In the manner described I provide a coupling permitting variable movements of the machine elements and by which power from one is transmitted to the other for actuating the same. It will be understood that the harvester 6 and axle 8 are suitably braced, as is common, and when it is desired to fold the harvester alongside the thrasher to reduce the width of the machine as a whole for transportation and storage purposes said axle 8 with harvester 6 may be swung horizontally to the position indicated by the dotted lines in Fig. 1. In thus adjusting the harvester it will be understood that the coupling assemblage remains constant during all movements thereof and the various gears maintained in operable relation, and while I have illustrated the same as connecting two axle sections such installation may be applied between any appropriate parts of the thrasher and harvester.

I claim as my invention:

1. In a combination harvester-thrasher, a coupling composed of two elements each comprising a sprocket, a gear rotated thereby, a gear-wheel meshing with said gear, a bearing having knuckles, a cage embodying knuckles, a gear in said cage, said knuckles being in alinement, and a pintle connecting said knuckles, gear wheel and gear, whereby the gear wheel of one of said coupling elements rotates a gear in said cage to rotate a like caged gear meshing therewith and forming part of the other of said elements.

2. In a combination harvester-thrasher, a coupling member connected to said thrasher, a bearing forming part of said coupling member, a sprocket mounted on said bearing, a gear wheel adjacent said sprocket and driven thereby, a bevel gear meshing with said gear wheel, a spiral gear alined with said bevel gear, means for connecting said bevel gear, bearing and spiral gear, and a coupling connected to said harvester comprising a spiral gear meshing with and driven by said first mentioned spiral gear, a gear wheel driven by the spiral gear of said harvester coupling, a gear meshing therewith, and a sprocket driven by said latter gear.

3. In a combination harvester-thrasher, a coupling comprising two members connecting said elements, gear-wheels mounted on said coupling members, intermeshing spiral gears supported by said members and driven by said gear-wheels, a sprocket on one of said members connected to and driven by said thrasher for rotating said gears, and a sprocket on the other of said members connected to said harvester for operating the same through power from said thrasher and first mentioned sprocket and said gears.

4. In a combined thrasher and harvester, coupling members secured to each of said elements and hingedly connected to each other, means for connecting one of said coupling members to said thrasher, gearing on said member, means for driving the same, a spiral gear in said member driven by said gearing, means for connecting the other of said couplings to a harvester, a spiral gear in said latter coupling meshing with said first mentioned spiral gear, gearing on said coupling rotated by the spiral gear thereon, and means on said harvester coupling for operating the same through power transmitted from said thrasher through the gearing in said coupling members.

5. In a combination harvester-thrasher, a coupling connecting said elements comprising a cage embodying oppositely disposed housings, gear wheels in said housings, pintles connecting said gears and cage, and means associated with said pintles whereby rotary motion is imparted from said thrasher for operating said harvester.

6. In a combination harvester-thrasher, a coupling member connected to said thrasher and terminating in knuckles, a cage embodying knuckles in alinement with said bearing knuckles, a gear wheel in said cage, a pintle connecting said knuckles and gear wheel, means associated with said pintle for actuating the same to rotate said gear wheel, and means for rotating said actuating means.

7. In a combination harvester-thrasher, a coupling connecting the same to permit vertical vibration of one in relation to the other, said coupling comprising two members, means for securing said coupling to permit adjustment thereof in a horizontal direction, driving means on the coupling secured to said thrasher, driven means on the coupling secured to said harvester, gears intermediate said driving and driven means, and means for actuating said driving means to rotate said gears and driven means for operating said harvester.

8. In a combination harvester-thrasher, coupling members for connecting said elements, a cage associated with said members, means connecting said cage and members to permit horizontal and vertical movements of one of said members in relation to the other, intermeshing gears in said cage, driving gears for rotating said intermeshing gears, and driven gears rotated by the action of said intermeshing gears for operating said harvester.

9. In a combination harvester-thrasher, coupling members for connecting said elements, a cage associated with said members embodying oppositely disposed gear wheel housings, pintles connecting said housings and members said pintles being positioned at right angles to each other.

10. In a combination harvester-thrasher, coupling members for connecting said elements, a cage associated with said members embodying gear-wheel housings and bearings, pintles in said bearings, intermeshing gears mounted on said pintles in said housings, means for driving said gears, and driven gears actuated by the rotation of said intermeshing gears to operate said harvester.

11. In a combination harvester-thrasher, coupling members for connecting said elements, a cage associated with said members, intermeshing gears mounted therein, driving mechanism operated by power from the thrasher element to rotate said intermeshing gears, driven mechanism actuated by the rotation of said intermeshing gears, and means associated with said driven mechanism for operating said harvester element.

In testimony whereof I affix my signature.

WALLACE F. MacGREGOR.